United States Patent [19]

Katayama

[11] Patent Number: 5,459,834
[45] Date of Patent: Oct. 17, 1995

[54] GRAPHIC PATTERN STORAGE DEVICE USING FIFO WITH FEEDBACK BETWEEN STORAGE STAGES

[75] Inventor: Hiroshi Katayama, Tokyo, Japan

[73] Assignee: NEC Corporation, Tokyo, Japan

[21] Appl. No.: 102,352

[22] Filed: Aug. 5, 1993

[30] Foreign Application Priority Data

Aug. 6, 1992 [JP] Japan .................................... 4-209885

[51] Int. Cl.⁶ .................................................. G06F 12/00
[52] U.S. Cl. .......................................... 395/164; 395/444
[58] Field of Search .................................... 395/162–166, 395/400, 425, 275; 345/197, 198, 201; 330/99, 100

[56] References Cited

U.S. PATENT DOCUMENTS 3,662,346  5/1972  Tada ............................... 395/164
4,243,943  1/1981  Cherry ............................ 330/100
4,858,107  8/1989  Fedele ............................ 345/197

*Primary Examiner*—Mark R. Powell
*Assistant Examiner*—Kee M. Tung
*Attorney, Agent, or Firm*—Foley & Lardner

[57] ABSTRACT

A plurality of stages are connected in series for storing graphic pattern data. In order to repeatedly use the graphic pattern data previously stored in any stage, the data of the lowermost stage is fed back to an upstream stage via a feedback bus. Each stage includes a data selector and a stage register. The data selector is switched by a write pointer and a feedback pointer to select the data to be stored in the stage register. Hence, regardless of different lengths of graphic patterns, a mapping of the graphic patterns can be carried out uniformly at a high speed.

2 Claims, 9 Drawing Sheets

GRAPHIC PATTERN STORAGE DEVICE USING FIFO WITH FEEDBACK BETWEEN STORAGE STAGES

BACKGROUND OF THE INVENTION

The present invention relates to a graphic pattern storage device for drawing graphics on a display of a computer and a printer, and more particularly to a graphic pattern storage device for drawing a line drawing.

DESCRIPTION OF THE RELATED ARTS

Conventionally, in drawing graphics, two drawing operations are used, that is, a line drawing by using line style of a broken line, a one-dotted line and the like, and a paint processing of certain areas by using paint patterns. The graphic patterns such as the line style and the paint patterns are stored in a predetermined storage device. In the drawing, the graphic patterns are successively read out when needed and after processing of the read graphic patterns depending on the kinds of the drawing, the drawing is carried out. The processing can be executed by a general microprocessor. However, in case of requiring the high speed operation, a graphics drawing device is often used. This graphics drawing device is a device for carrying out a drawing by using an exclusive hardware or firmware.

The operation of the drawing by using the graphic patterns in the conventional graphics drawing device will now be described with reference to a drawing example using the line style.

First, the graphic patterns are specified in two ways. In the first way, the graphic pattern is determined by one bit per pixel, which is called a color extension mode. In the second way, the graphic pattern is determined by n bits per pixel, which is called a memory immediate mode. Further, in case of the line style, in order to define this, three pointers are used, that is, a TOP pointer for indicating the head of each pattern, a TAIL pointer for indicating the end point of the pattern, and a current pointer for indicating a position of a pattern to be referred.

FIGS. 1A and 1B show a mapping of a graphic pattern in the color extension mode for explaining a conventional graphics drawing device. As shown in FIG. 1A, in an operational procedure concerning the line style in the color extension mode, first, one word including line style data indicated by the current pointer is read into a pattern register 27 from the line style data extended on a line style storage memory 24. Secondly, one bit of data indicated by the current pointer are selected from the pattern register 27 by a data selector 28. Thirdly, the output of the data selector 28 is input into a selector 29 for selecting one of a color 0 register 25 and a color 1 register 26. Then, fourthly, a value (SRC) of the color register selected by the selector 29 is input into a raster operation circuit 31. The raster operation circuit 31 executes a calculation on the basis of the SRC from the selector 29, drawing destination data (DST) from a drawing destination memory 32 and mask information (MSK) produced in a mask generator 30 to produce new drawing destination data (DST') of the drawing destination memory 32. In this case, the operations of the mask generator 30 and the raster operation circuit 31 are not directly related to the graphic pattern storage device and thus the description thereof can be omitted for brevity.

Next, fifthly, the value of the produced new drawing destination data (DST') is written into the drawing destination memory 32. Further, sixthly, if "the current pointer: the TAIL pointer", the value of the TOP pointer is copied to the current pointer in the line style storage memory 24. Otherwise, the current pointer is added by '+1'. Now, when the word including the current pointer is changed by this renewal, the operation is returned to the aforementioned first step. On the contrary, when the current pointer is still within the same word, the operation is returned to the above-described second step.

By carrying out the aforementioned operation, a line shown in FIG. 1B can be drawn. In this case, one word is 32 bits and one pixel is 8 bits. Also, a hexadecimal number '55555555' is set in the color 0 register 25 which is referred when the line style value is '0' and another hexadecimal number 'AAAAAAAA' is set in the color 1 register 26 which is referred when the line style is '1'.

Next, the operation of the drawing relating to the line style in the memory immediate mode in a conventional graphics drawing device will now be described in connection with FIGS. 2A and 2B.

FIGS. 2A and 2B show a mapping of a graphic pattern in the memory immediate mode for explaining a conventional graphics drawing device. As shown in FIGS. 2A, in an operational procedure concerning the line style in the color extension mode, first, one word including line style data indicated by the current pointer is read into the pattern register 27 from the line style data extended on the line style storage memory 24. Then, secondly, the contents in the pattern register 27 are shifted by a barrel shifter 34 so that the line style data indicated by the current pointer may become the drawing position in the drawing destination. The shift amount of barrel shifter 34 is determined by a shift amount determination circuit 33. Next, thirdly, the shifted value (SRC) of the pattern register 27 is input into the raster operation circuit 31. This raster operation circuit 31 is carried out by a calculation on the basis of the SRC, the drawing destination data (DST) and the mask information (MSK) produced in the mask generator 30 to produce the new drawing destination data (DST').

Next, fourthly, the value of the new destination data (DST') is written into the drawing destination memory 32. Further, fifthly, if "current pointer=TAIL pointer", the value of the TOP pointer is copied to the current pointer in the line style storage memory 24, otherwise, the current pointer is advanced by one pixel. Even when the current pointer is still within the same word by this renew, the operation is returned to the above-described second step.

By the above-described operation, a line shown in FIG. 2B can be drawn. In this case, one word is 32 bits and one pixel is 8 bits.

In general, the graphic patterns are extended on a memory outside a graphics drawing device and are read into a pattern register at a necessary time to carry out a processing. However, in another case, in order to improve a processing speed, a working memory is provided within the graphics drawing device and the graphic patterns are initially transferred to the working memory. In this case, an access to the internal memory can be executed at a high speed in comparison with an access to the external memory.

Also, in still another case, the graphic patterns are restricted to the size of the pattern register and are directly determined to the pattern register. In this case, the line style of a fixed length such as 16 bits can not be handled. However, since no renewal is carried out in the pattern register during the drawing, the control becomes simple and can be performed at a high speed. In the previous case, only the second to fourth steps are executed and there is no need to execute the first step, the reading of the graphic patterns into the pattern register from the memory and the fifth step, the discrimination.

In the graphic pattern storage device using the graphic patterns in the conventional graphics drawing device, the following defects arise:

1) Since the graphic patterns are directly determined into the pattern register, the lengths of the patterns are limited due to the size of the pattern register.

2) Since the graphic pattern data are stored on the working memory within the graphics drawing device, similarly, the lengths of the graphic patterns are restricted to the size of the working memory.

3) In case of the long graphic patterns, the patterns are placed on the memory and in case of the short graphic patterns, the patterns are placed on the working memory. Hence, in this case, the changing of the storing place of the patterns depending on the definition lengths of the graphic patterns becomes a cause of unnecessary confusion for an application using the graphics drawing device.

4) Since the graphic pattern data are stored in the working memory within the graphics drawing device, it is necessary to transfer the whole graphic patterns from the main memory to the working memory in advance. However, when the graphic patterns are frequently changed and the graphic pattern length>the drawing pixel number, the transfer of the whole graphic patterns to the working memory becomes a large overhead.

5) When in case of the graphic patterns placed on the memory, the same part as the previously used graphic patterns is used again after using the patterns one round, it is necessary to read the graphic pattern data again from the memory.

SUMMARY OF THE INVENTION

It is therefore an object of the present invention to provide a graphic pattern storage device in view of the aforementioned problems of the prior art, which is capable of handling graphic patterns in one way and achieving a high speed operation.

In accordance with one aspect of the present invention, there is provided a graphic pattern storage device, comprising a plurality of stages connected in series from an upper side to a lower side for storing one word of graphic pattern data; shift means for transferring the data from the upper stage to the lower stage adjacent thereto; write means for writing the graphic pattern data into any of the stages via an external input bus; feedback means for transferring the graphic pattern data stored in the lowermost stage to any of the stages via a feedback bus; and selecting means for selecting one of the shift means, the write means and the feedback means for use with respect to each of the stages.

The selecting means can include a write pointer for indicating one stage to select the write means for writing the graphic pattern data to the one stage; a feedback pointer for indicating one stage to select the feedback means for feeding back the graphic pattern data to the one stage; and means for renewing the write pointer according to an input request signal and an output request signal fed from outside.

Each stage can include a register for storing the graphic pattern data; and a flag for indicating whether or not a value stored in the register is valid, and produce the write pointer on the basis of information of the flag, an input request signal and an output request signal, these signals being fed from outside.

BRIEF DESCRIPTION OF THE DRAWINGS

The objects, features and advantages of the present invention will become more apparent from the consideration of the following detailed description taken in conjunction with the accompanying drawings in which.

DESCRIPTION OF THE PREFERRED EMBODIMENTS

Figure 3:
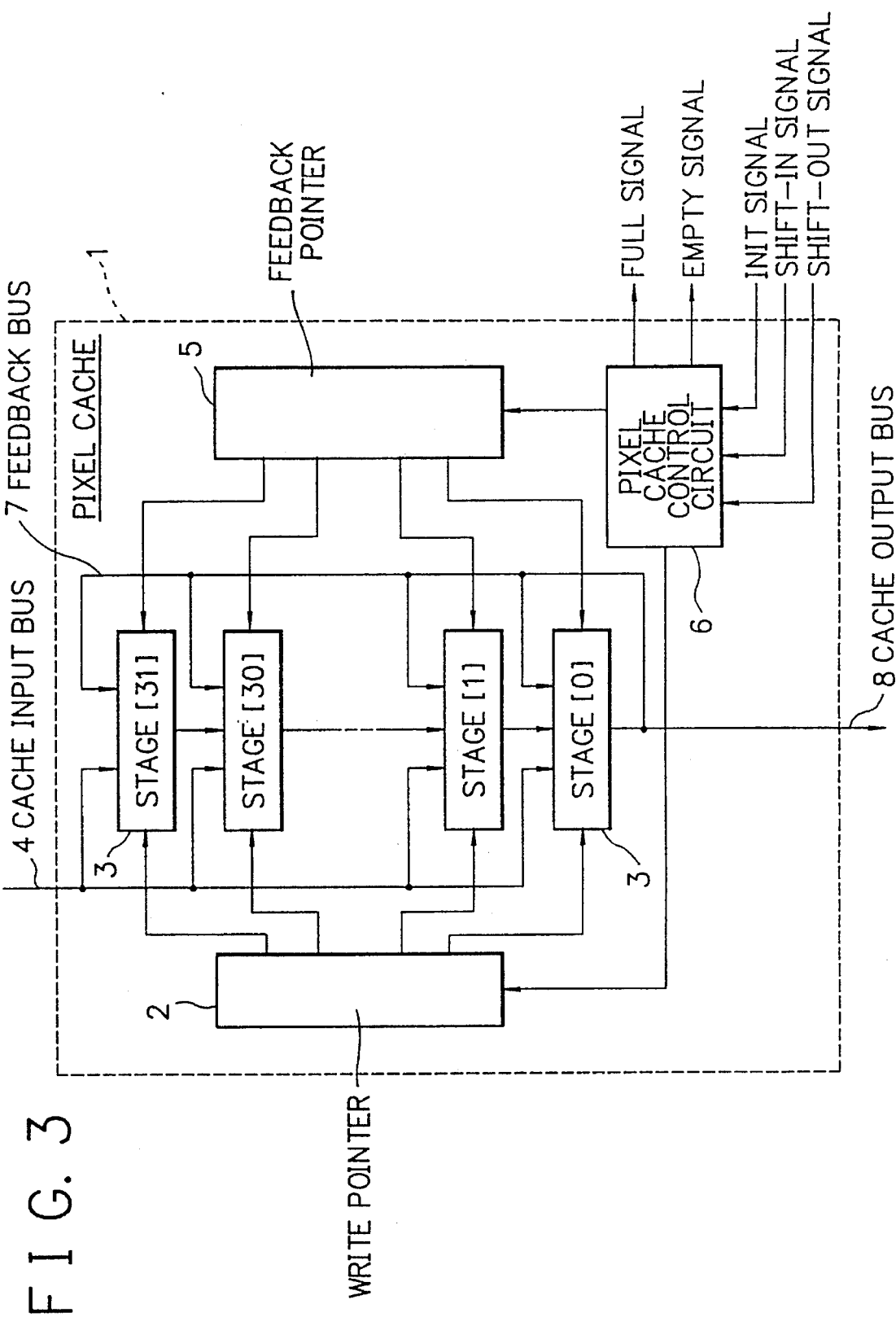
FIG. 3 is a block diagram of a first embodiment of a graphic pattern storage device in the form of a pixel cache according to the present invention.

Referring now to the drawings, wherein like reference characters designate like or corresponding parts throughout the views and thus the repeated description thereof can be omitted for brevity, there is shown in FIG. 3 the first embodiment of a graphic pattern storage device in the form of a pixel cache according to the present invention.

As shown in FIG. 3, in this embodiment, the pixel cache 1 is comprised of a plurality of stages 3 for storing graphic patterns, a write pointer 2 for determining one stage 3 for writing the pattern data from the plurality of stages 3, a feedback pointer 5 for determining one stage 3 for feeding back the data of the stage [0] 3 of the plurality of stages 3, and a pixel cache control circuit 6 for controlling the write pointer 2 and the feedback pointer 5 and for producing status information. Each stage 3 inputs the data from a cache input bus 4 and a feedback bus 7 and outputs the data to the next stage 3. The output of the stage [0] 3 is output to the feedback bus 7 and cache output bus 8.

Figure 4:
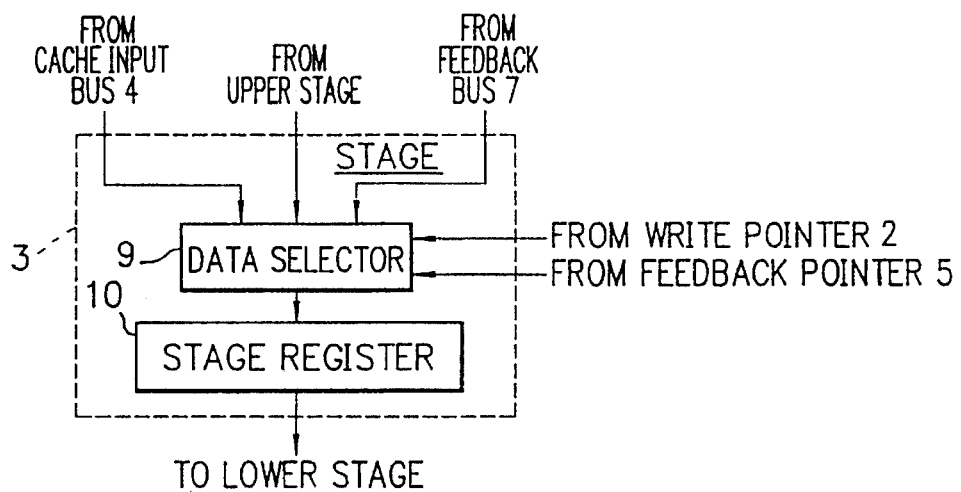
FIG. 4 is a block diagram showing a structure of stages shown in FIG. 3.

FIG. 4 illustrates the structure of the stages 3. As shown in FIG. 4, each stage 3 includes a data selector 9 for selecting one of the data from the cache input bus 4, the data from the upper stage 3 and the data from the feedback bus 7 on the basis of the instructions of the write pointer 2 and the feedback pointer 5, and a stage register 10 for storing the data selected by the data selector 9 and outputting the stored data to the lower stage 3. The uppermost stage 3 inputs only the data from the cache input bus 4 and the feedback bus 7 and selects one of the input data.

Next, the operation of pixel cache as the graphic pattern storage device shown in FIG. 3 will now be described.

First, the pixel cache 1 is controlled by the three control signals such as an INIT signal, a shift-in signal and a shift-out signal. When the INIT signal becomes active, the inside of the pixel cache control circuit 6 is initialized and thus the graphic pattern data stored within the pixel cache 1 are invalidated. Also, the shift-in signal becomes active, the value of the graphic pattern data input in the cache input bus 4 at this time is taken into the pixel cache 1. Further, the shift-out signal becomes active, the data within the pixel cache 1 are shifted and rotated and new graphic pattern data are output to the cache output bus 8. In this case, although all the stages 3 are basically constructed as a shift register, the stage [0] 3 can output the data to not only the cache output bus 8 but also any stage 3 via the feedback bus 7. By this function, the graphic pattern data once stored within the pixel cache 1 can be circulated among the stages 3 and be repeatedly used.

Figure 8:
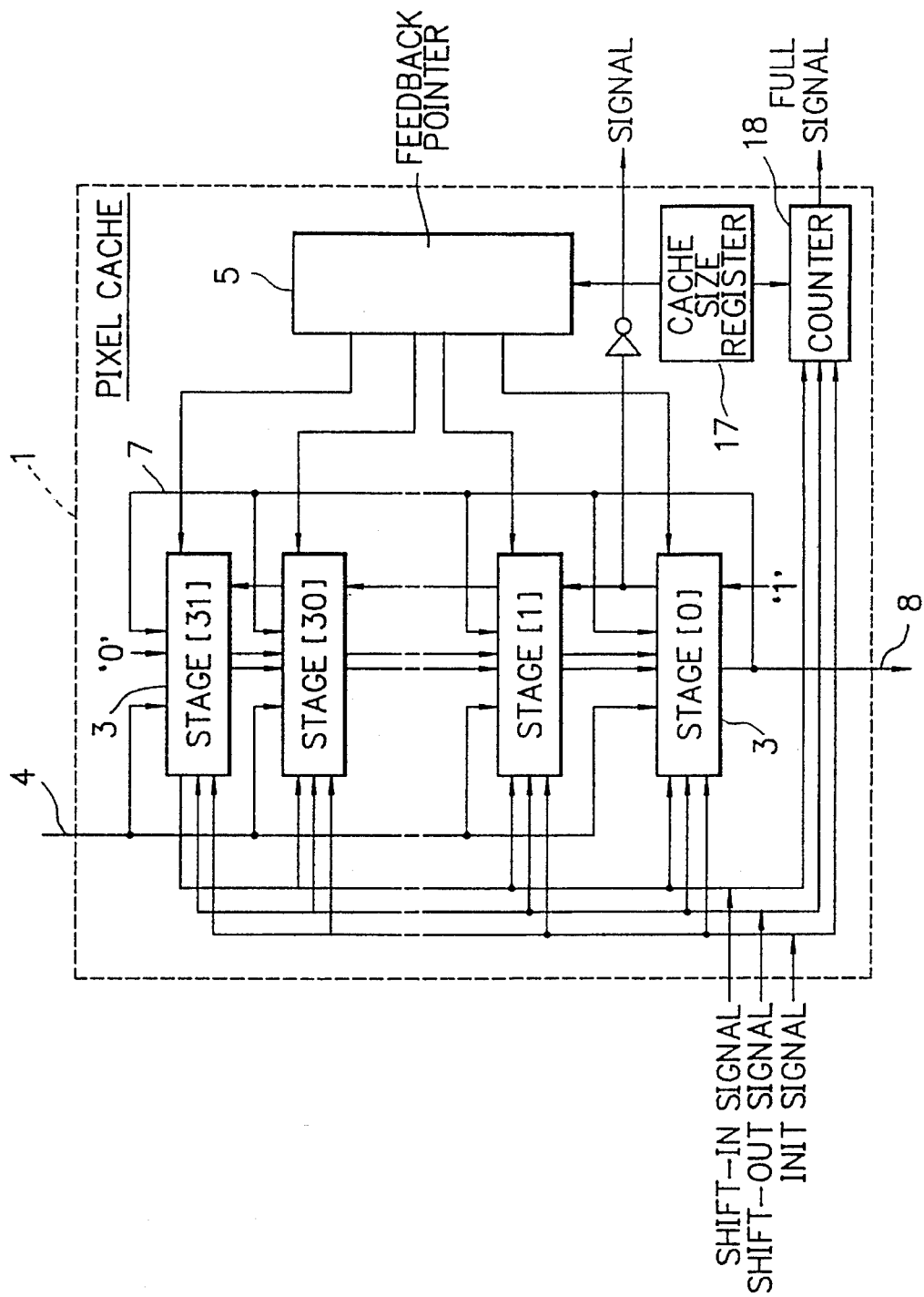
FIG. 8 is a block diagram of a second embodiment of a graphic pattern storage device in the form of a pixel cache according to the present invention.
Figure 8A:
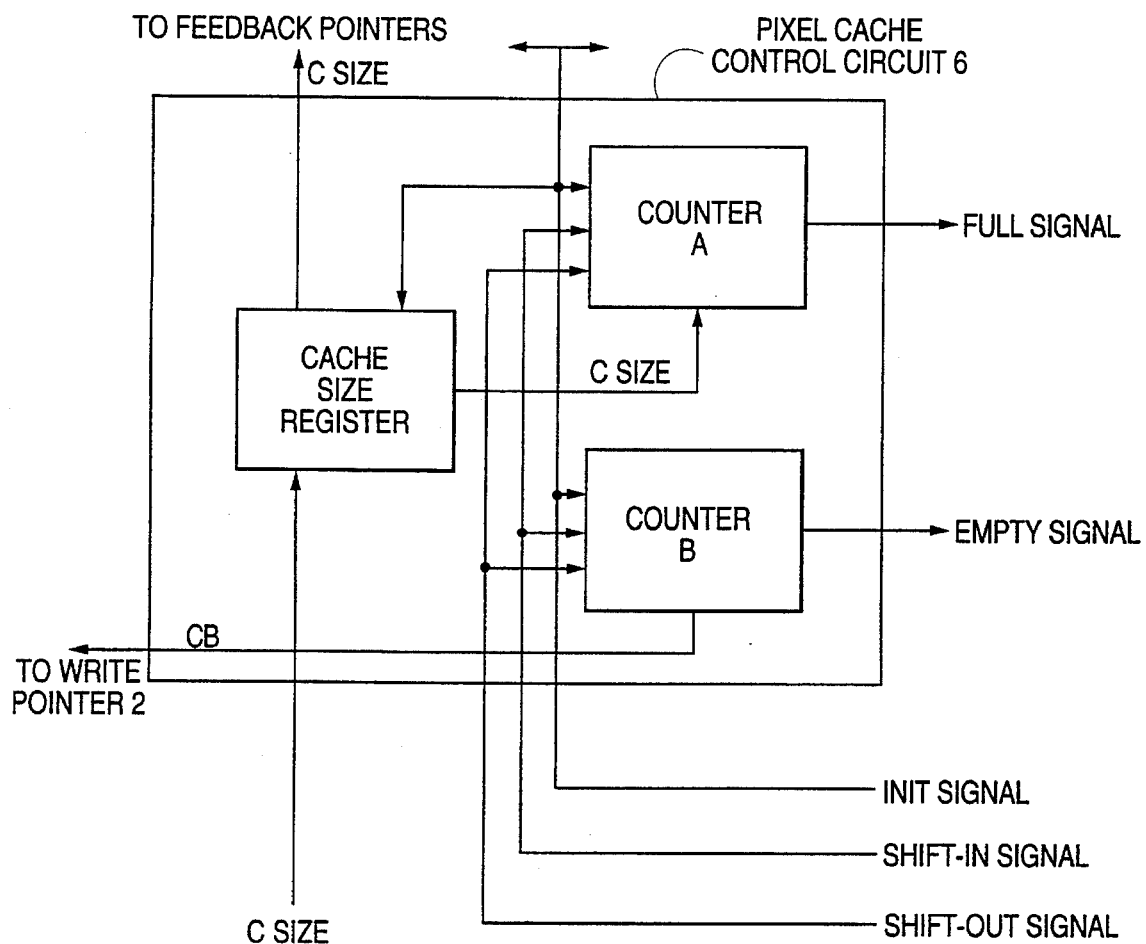
FIG. 8A is a block diagram of a pixel cache control circuit for use in the invention.

For carrying out these operations, the pixel cache control circuit 6 includes a cache size register to be set from outside, and two counters A and B each controlled by the shift-in signal and the shift-out signal as illustrated in FIG. 8A. In the following description, it is assumed that a value set in the cache size register is CSIZE and values set in the two counters A and B are CA and CB, respectively, and that the maximum stage number [31] is indicated by MSSIZE. This CSIZE is sent to the feedback pointer 5 as it is, so as to be used for instructing the destination of the feedback of the stage [0] 3. The stage [0] 3 to the stage [CSIZE] 3 are used for storing the graphic patterns. Also, the counter A within the pixel cache control circuit 6 counts the number of the valid data within the pixel cache 1 and the counter B counts the stage number of the minimum stage number having the invalid data.

Next, by activating the INIT signal, the two counters A and B within the pixel cache control circuit 6 are cleared. That is, $$CA=0, \text{ and } CB=0$$

Then, by activating the shift-in signal, the input data are cached in the following procedure:

1) The counter value CB is set in the write pointer 2 and the graphic pattern data on the cache input bus 4 are stored in the stage [CB].
2) The value of each counter is renewed.

$$CA=CA+1, \text{ and } CB=CB+1$$

Further, by activating the shift-out signal, the shift and rotation of the graphic pattern data stored in each stage 3 are carried out in the following procedure:

1) The value in the stage [N] is transferred to the stage [N−1]. At this time, the invalid data are input to the stage [31].
2) However, in case of CSIZE≦MSIZE, the value of the stage [0] is transferred to the stage [CSIZE] via the feedback bus 7. In turn, in case of CSIZE >MSIZE, the value in the stage [0] is lost from the pixel cache 1.
3) The value of the counter is renewed.

$$CB=CB-1$$

If $CSIZE>MSIZE$, then $CA=CA-1$

Also, both the shift-in signal and the shift-out signal can be allowed to be activated at the same time. In this case, the operation is executed as follows:

1) The value of the stage [N] is transferred to the stage [N−1]. At this time, the invalid data are input to the stage [31].
2) However, in case of CSIZE≦MSIZE, the value of the stage [0] is transferred to the stage [CSIZE] via the feedback bus 7. In case of CSIZE>MSIZE, the value of the stage [0] is lost from the pixel cache 1.
3) (CB−1) is set in the write pointer 2 and the graphic pattern data on the cache input bus 4 are stored in the stage [CB−1].
4) The value of the counter is renewed.

If $CSIZE≦MSIZE$, then $CA=CA+1$

As described above, the reason why the operation is changed depending on the result of the comparison between CSIZE and MSIZE is that the operation mode of the pixel cache 1 changes depending on the fact whether or not the whole of the defined graphic pattern data can be stored in the pixel cache 1. If CSIZE≦MSIZE, the whole of the defined graphic patterns can be stored in the pixel cache 1. At this time, the pixel cache 1 stores the graphic pattern by using the stage [0] to the stage [CSIZE] and the stored data are circulated among these stages by the shift-out control.

On the contrary, if CSIZE>MSIZE, the whole of the defined graphic patterns can not be stored in the pixel cache 1. At this time, the pixel cache 1 operates like FIFO (first-in first-out). That is, the graphic pattern data 10 stored by the shift-in signal are consecutively moved to the lower stage every time when the shift-out signal is activated and at the end, by the shift-out from the stage [0], the data are erased from the pixel cache 1.

Also, the status information of the pixel cache 1 is represented by an EMPTY signal and a FULL signal. The EMPTY signal indicates that the stage [0] stores the invalid data and the FULL signal indicates that all the valid stages such as the stage [0] to the stage [CSIZE] or the stage [MSIZE] store the valid data. These signals can be produced by the following:

$$FULL=(CA=CSIZE) \text{ when } CSIZE≦MSIZE$$

$$FULL=(CA=MSIZE) \text{ when } CSIZE>MSIZE$$

$$EMPTY=(CB=0)$$

Next, a graphic drawing device using the above-described pixel cache 1 will now be described.

Figure 5:
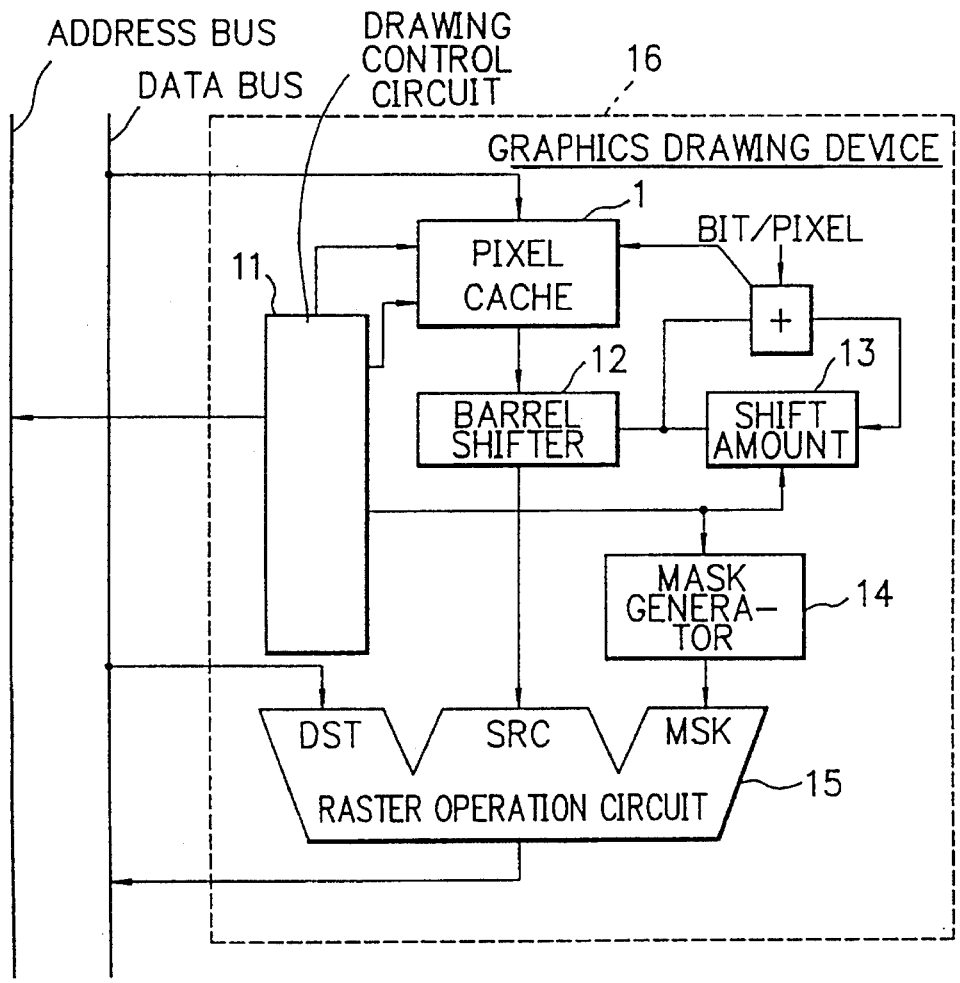
FIG. 5 is a block diagram of a graphics drawing device using the pixel cache shown in FIG. 3.

FIG. 5 illustrates the graphic drawing device 16 using the pixel cache 1 shown in FIG. 3. As shown in FIG. 5, the control of the whole system is performed by a drawing control circuit 11 and a firmware included therein. The basic functions executed by the drawing control circuit 11 are as follows:

1) Depending on the graphics instructed for the drawing, the positions of the pixels to be drawn are successively calculated and the drawing addresses corresponding to the pixels are produced.
2) Against the word addresses of the graphic pattern the current pointer indicates, a read access is executed. As a result, the read data are stored in the pixel cache 1.
3) A difference between the bit position within the word of the pixels to be drawn and the bit position within the word of the graphic pattern data corresponding to the pixels is calculated in a BIT/PIXEL and is set as a shift amount 13 of a barrel shifter 12.

4) The data of the drawing destination are read, and the output of the pixel cache 1 through the barrel shifter 12 and an output of a mask generator 14 are synthesized in a raster operation circuit 15 to produce new drawing destination data. The new destination data are rewritten in the drawing destination pixels.

5) The value of the current pointer is renewed, and, when the current pointer is beyond the word boundary, the pixel cache 1 is shifted out. In this case, the renewal method of the current pointer is executed in the same manner as a conventional method.

In the above-described system structure, the bus width is 32 bits, that is, one word=4 bytes. The bit address is the address per bit unit of the pixel that the pointer indicates, and the low order 5 bits of the bit address indicates the bit position within the word. When drawing control circuit access memory, the word address obtained by eliminating the low order 5 bits from the bit address is output and by using the word address as the unit, the memory access is executed.

First, a CPU (not shown) stores parameter information relating to the graphic patterns to the drawing control circuit 11. At this time, necessary information includes a pattern word number in addition to a TOP pointer, a TAIL pointer and a current pointer as a reference start point of the pattern which are used in the conventional embodiment.

In this case, the pattern word number is a value for representing a word number of the defined whole patterns and can be calculated as follows:

The pattern word number=the word address of the TAIL pointer– the word address of the TOP pointer.

This pattern word number is set in the cache size register within the pixel cache control circuit 6. At the same time, the INIT signal is activated prior to the drawing and the pixel cache 1 is initialized.

When the graphic pattern data are stored in the pixel cache 1, two methods are considered from its sequence. The first method is a method for reading in the graphic pattern data in batch.

Figure 6:
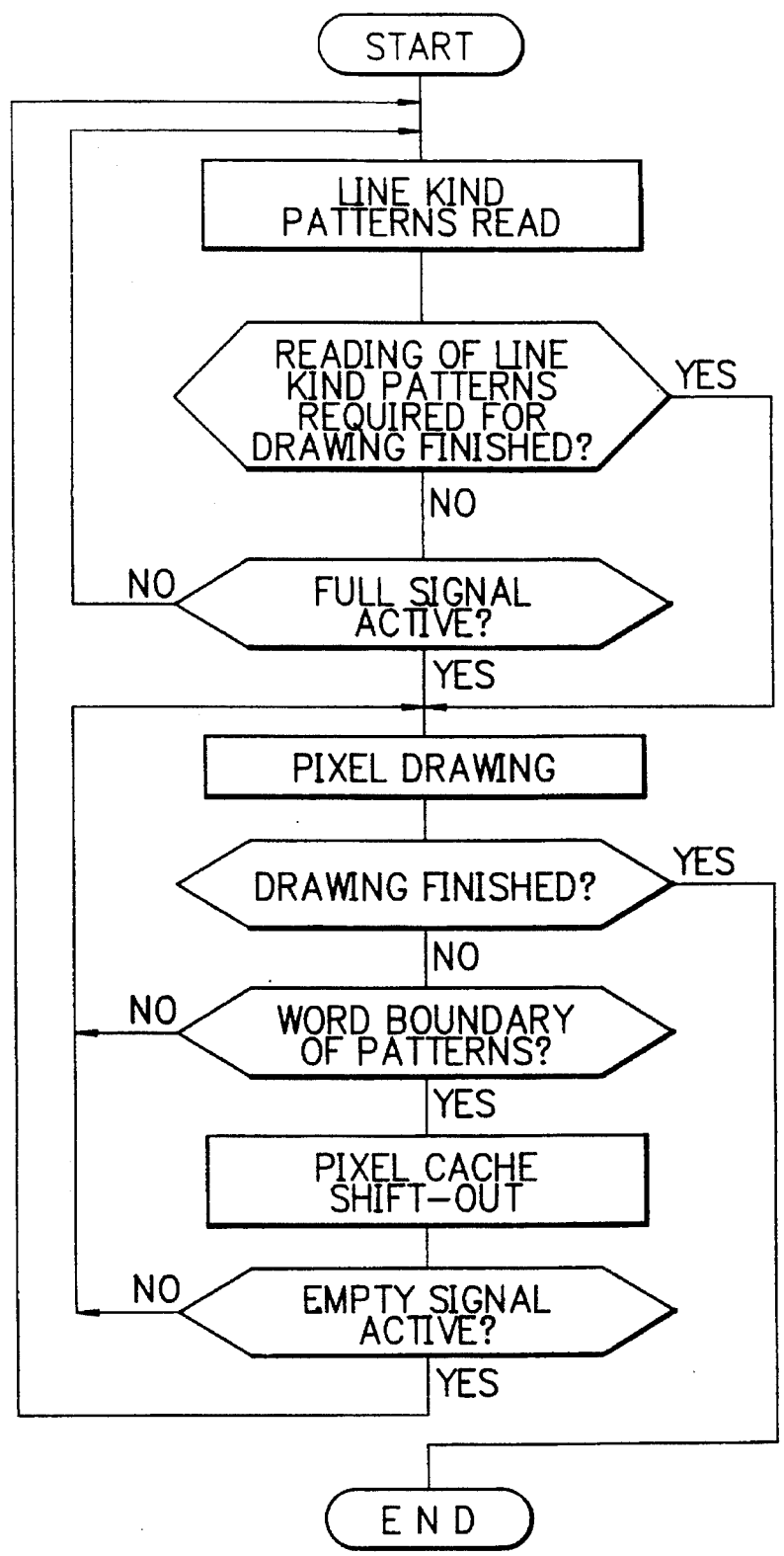
FIG. 6 is a flow chart for showing a batch reading control to the pixel cache shown in FIG. 5.

FIG. 6 shows a processing flow for carrying out a batch reading control to the pixel cache 1 shown in FIG. 5. As shown in FIG. 6, in such a processing, the drawing control circuit 11 repeats the read of the graphic pattern data until the pixel cache 1 becomes FULL or the graphic pattern length required by the graphic to be drawn is stored in the pixel cache 1. After this, the drawing processing is executed until the pixel cache 1 becomes EMPTY. At the end, when the pixel cache 1 becomes EMPTY, the operation is moved again to the graphic pattern read.

The second method is a method for repeating a process in which one word of the graphic pattern data are read and the drawing processing is carried out by using the graphic pattern included in the read data.

Figure 7:
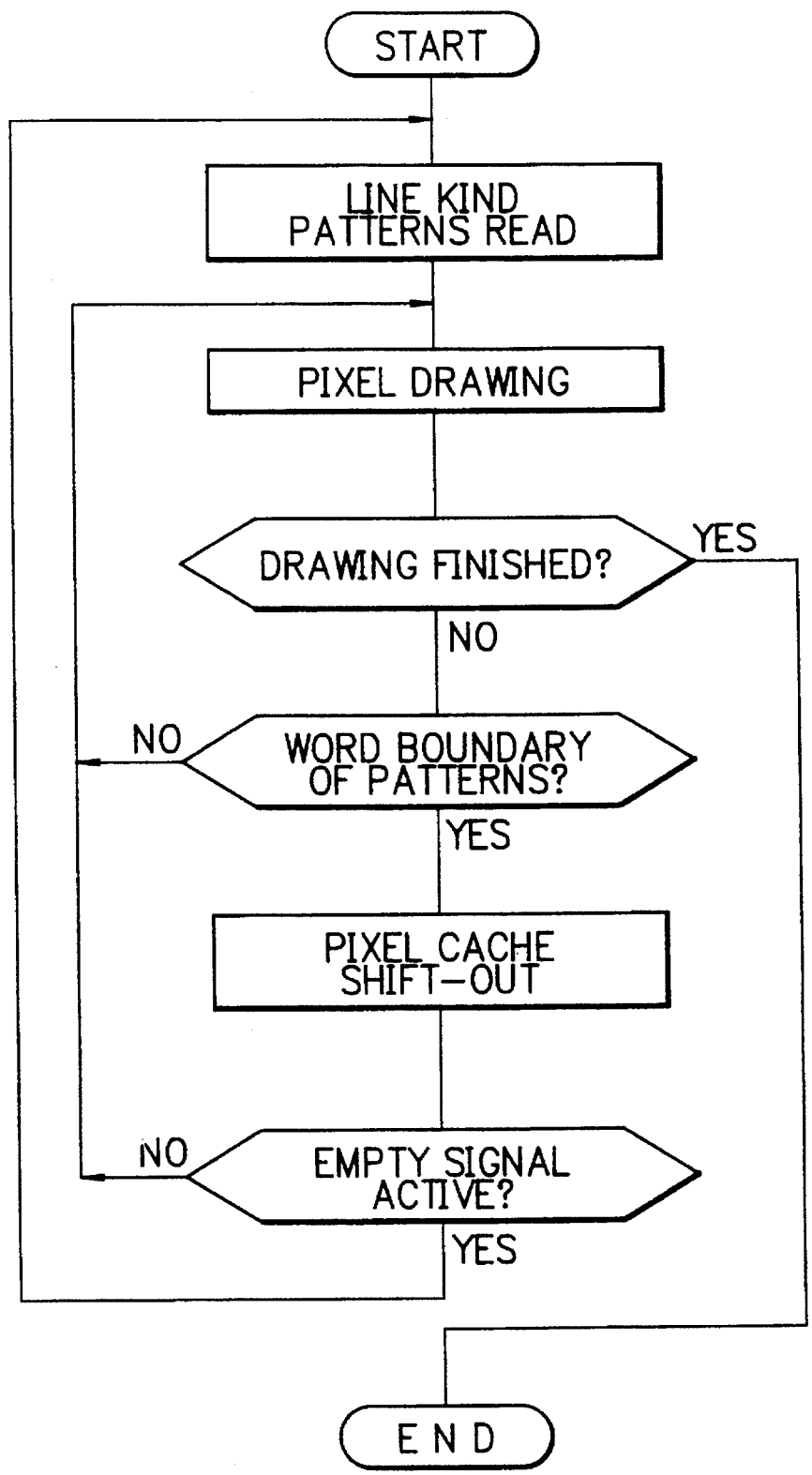
FIG. 7 is a flow chart for showing a divided reading control to the pixel cache shown in FIG. 5.

FIG. 7 shows a processing flow for executing a divided reading control against the pixel cache 1 shown in FIG. 5. As shown in FIG. 7, in this process, for example, in case of the graphic system of 4 bits per pixel. 8 pixels of graphic pattern data are included in one word, and thus one word of the graphic pattern read and 8 pixels of the drawing processing are alternately executed.

As described above, in the first method, since the graphic pattern read is continuously performed, it is valid in a system capable of using a high speed access mechanism such as a page mode or the like in a memory for storing the graphic patterns. Also, in the second method, the branch portions in the flow of the processing becomes less and the control of the whole system can be simplified. However, these methods are the same in viewpoint of the improvement of the drawing speed by the reduction of the useless graphic pattern read.

Next, when the whole of the graphic patterns are once stored in the pixel cache 1, the EMPTY signal never becomes active after that and only the pixel drawing processing is continuously performed. Whether or not the whole graphic patterns can be stored in the pixel cache 1 is decided by the pattern word number (stored in the cache size register within the pixel cache) determined when the graphic patterns are initially defined. However, in spite of its decision, the same pattern read and drawing sequence can be used.

Lastly, a comparison between the present embodiment and the conventional embodiment will now be carried out. First, the comparison is executed with the conventional embodiment wherein the graphic pattern data are placed on the memory. At the initial stage, the graphic pattern data are read out of the memory and are stored in the pattern register (conventional embodiment) or the pixel cache (present embodiment), which is equal. However, when the graphic patterns can be stored in the pixel cache 1, in the present embodiment, it is unnecessary to execute the graphic pattern read after that and thus the operation is accelerated for such a portion in this embodiment.

Also, the present embodiment is compared with the conventional embodiment wherein the graphic pattern data are placed on the working memory. The storing the graphic pattern data in the pixel cache 1 and the setting of the graphic patterns on the working memory in the present embodiment can be substantially the same as the conventional embodiment. However, when the graphic patterns are set on the working memory, usually, the whole patterns are initially defined. In turn, in the present embodiment, actually, only the graphic pattern data required for the mapping are stored. Hence, in the conventional embodiment, the graphic pattern data not used as a consequence are also read, and thus the operation is possibly delayed for such a part.

Further, in comparison with the conventional embodiment wherein the graphic patterns are directly set on the pattern register, the setting of the graphic patterns in the pattern register at the initial time and the storing of one word of the graphic pattern data in the pixel cache 1 can be considered as equivalent. After this, in both embodiments, by using only the stored graphic pattern data, the pattern mapping is executed and thus there is no difference.

In FIG. 8, there is shown a structure of the second embodiment of a pixel cache according to the present invention. In this embodiment, as shown in FIG. 8, the operation of the pixel cache 1 is similar to the pixel cache 1 in the first embodiment described above. Hence, for the construction of the graphics drawing device using the pixel cache 1 and the read sequence of the graphic pattern data, FIGS. 5 to 7 can be used in the same manner as the first embodiment. Hence, the different part from the first embodiment will be mainly described.

In FIG. 8, the pixel cache 1 is comprised of a plurality of stages 3, a feedback pointer 5, a cache size register 17 for instructing the size of the pixel cache 1, and a counter 18 for counting valid data number within the pixel cache 1. Each stage 3 inputs the data from a cache input bus 4, a feedback bus 7 and an upper stage 3 and outputs the data to a lower stage 3. In this case, only the stage [31] inputs '0'.

Figure 9:
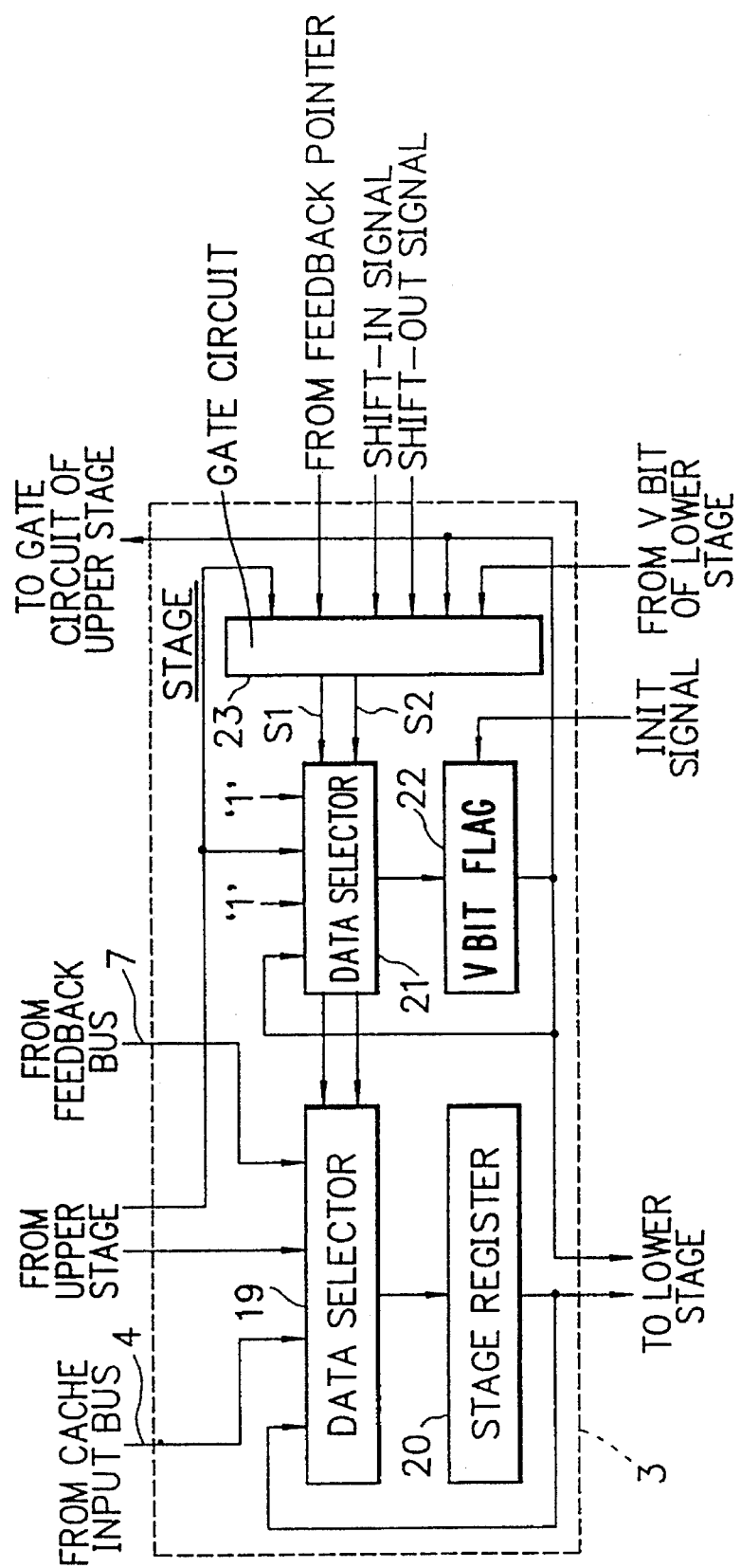
FIG. 9 is a block diagram showing a structure of stages shown in FIG. 8.

FIG. 9 illustrates the structure of the stages 3 shown in FIG. 8. As shown in FIG. 9, each stage 3 includes two data selectors 19 and 21, a stage register 20 for storing the graphic patterns as the output of the data selector 19, a V bit (flag) 22 for indicating whether or not the data stored in the stage register 20 are valid, and a gate circuit 23. In particular, the gate circuit 23 produces signals for switching the inputs of the data selectors 19 and 21 according to the following logical formulas:

$$S1 = \overline{(SI \cdot SO \cdot Vself \cdot Vlower) + (SI \cdot SO \cdot Vself \cdot Vupper) + (SO \cdot FP)}$$

$$S2 = SO(SI + FP)$$

wherein '·' represents a logical product, '+' represents a logical sum, Vself represents value of the V bit of the present stage, Vlower represents a value of the V bit of one lower stage of the present stage, Vupper represents a value of the V bit of one upper stage of the present stage, SI represents a logical value at the signal line labeled SHIFT-IN SIGNAL, SO represents a logical value at the signal line labeled SHIFT-OUT SIGNAL, and FP represents a logical value at the signal line labeled FROM FEEDBACK POINTER (which takes on a value "1" at the stage designated by the feedback pointer).

In this case, the value of the stage register 20 and the value of the V bit 22 are handled together. Also, the inputs of the two data selectors 19 and 21 are switched by the outputs signals S1 and S2 of the gate circuit 23, as shown in Table 1, to control the shift and rotation of the graphic pattern data within the pixel cache 1.

TABLE 1

| S1 | S2 | Input to be selected |
|----|----|---------------------|
| 0  | 0  | value of own stage  |
| 0  | 1  | value of upper stage |
| 1  | 0  | value of input bus  |
| 1  | 1  | value of feedback bus |

In this case, when the cache input bus 4 is selected by the input of the data selector 21 concerning the V bit 22, it is apparent to obtain '1' from the definition, but, when the feedback bus 7 is selected, '1' is obtained. This result is premised on the controlling for carrying out the shift-out only when the stage [0] stores the valid data, in an external circuit side for controlling the pixel cache 1.

First, the value is set to the cache size register 17 from the outside of the pixel cache 1 to activate the INIT signal. This INIT signal clears the V bit 22 of all the stages 3 and the counter 18 within the pixel cache 1. When the V bit 22 is cleared, at this time, the valid data are lost within the pixel cache 1.

On the other hand, when the shift-in signal or the shift-out signal is independently actuated or both these signals are simultaneously actuated, the data of each stage 3 can be calculated from the logical formulas of S1 and S2 and Table 2. Also, the value of the counter 18 is operated under the same condition as the counter A of the first embodiment described above.

From these, the EMPTY signal and the FULL signal as the status information can be produced as follows:

FULL=(value of counter 18=CSIZE) when CSIZE≦MSIZE

FULL=(value of counter 18=MSIZE) when CSIZE>MSIZE

EMPTY=(V bit of stage [0]=0)

The external specification of the aforementioned pixel cache 1 is the same as the pixel cache of the first embodiment. Hence, a description of a graphics drawing device using the pixel cache 1 with reference to a figure is the same as the first embodiment and thus can be omitted for brevity.

Figure 1A:
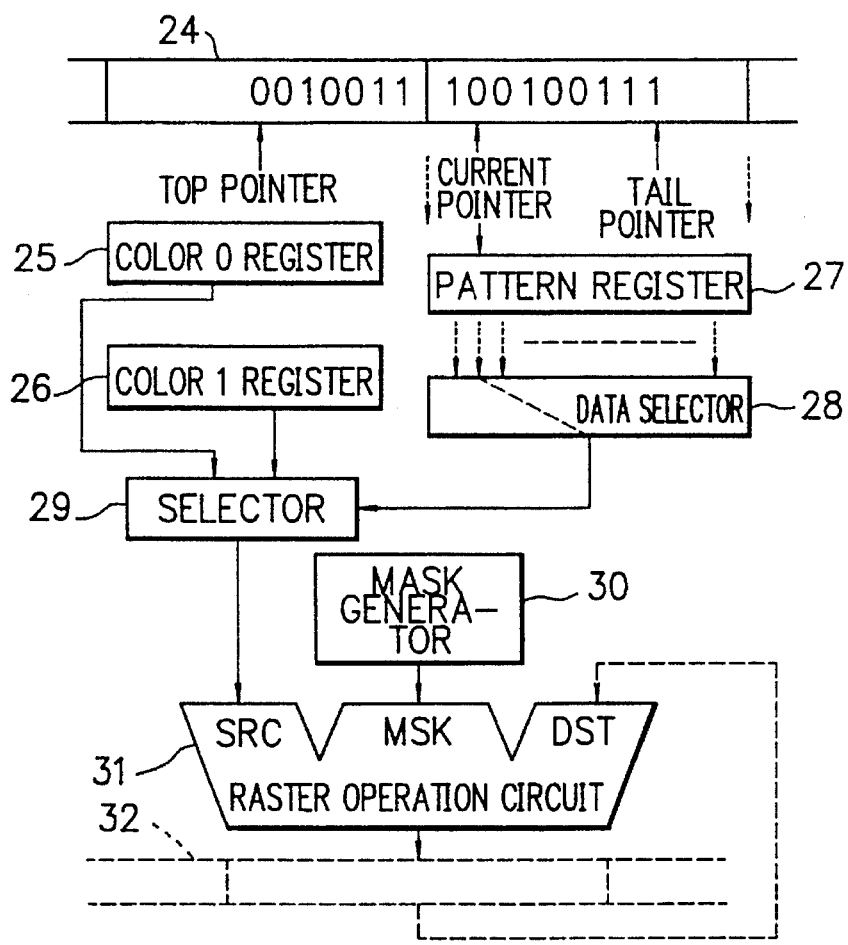
FIGS. 1A and 1B are schematic views illustrating a mapping of graphic patterns in a color extension mode for explaining a conventional graphics drawing device.
Figure 1B:
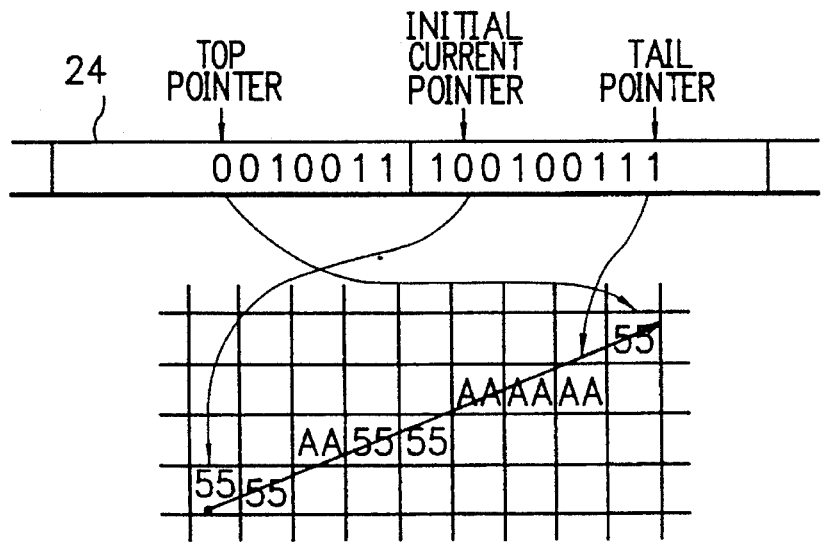
Figure 2A:
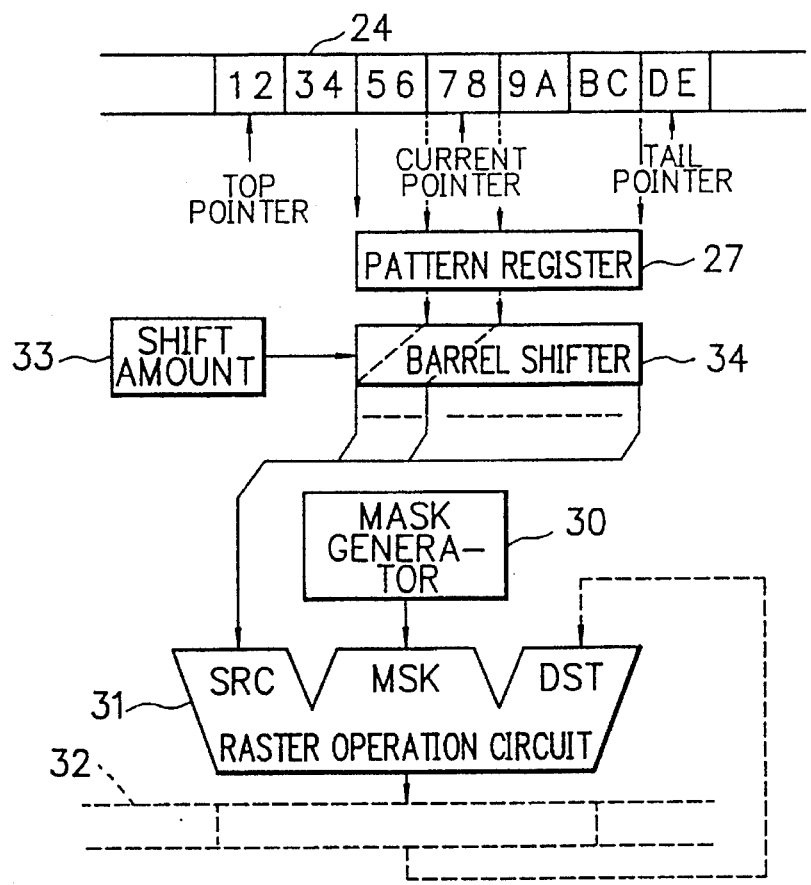
FIGS. 2A and 2B are schematic views illustrating a mapping of graphic patterns in a memory immediate mode for explaining a conventional graphics drawing device.
Figure 2B:
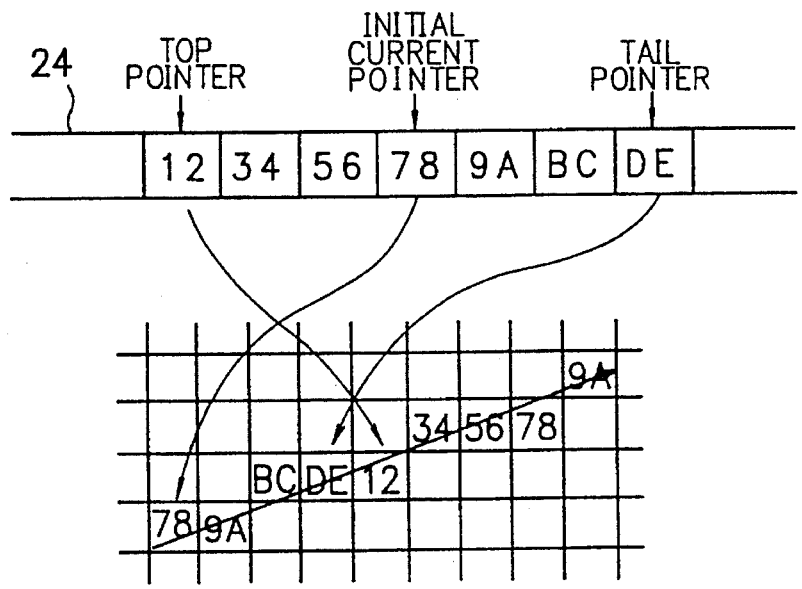

In the embodiments according to the present invention, although only the graphic pattern mapping in the memory immediate mode has been described, of course, it can be also used in the color extension mode. In this case, the construction of the pixel cache 1 is still not changed and the output of the pixel cache 1 is modified so as to change only the processing of the part input to the raster operation circuit 15 in the same manner as shown in FIG. 2A.

Further, the paint processing within the drawing using the paint patterns can be also executed in the same manner as the mapping of the line style in the line drawing. In this case, the paint area can be regarded as a set of horizontal straight lines and one line within the paint pattern corresponding to each horizontal straight line can be determined as the line style.

Also, in this embodiment, although the example wherein one word is 32 bits and one pixel is 4 bits has been described, these values are not restricted to the above description so far as a relationship between the bit number of one word and the bit number of one pixel can be kept to be an integer number time.

As described above, according to the present invention, in the graphic pattern storage device (the pixel cache), the handling of the graphic patterns in the graphics drawing device can be controlled in one way and the drawing can be made at a high speed.

That is, in the conventional graphic pattern storage device, there are three typical storage places of the graphic patterns, that is, (a) on the memory, (b) on the working memory of the graphics drawing device, and (c) on the pattern register within the graphics drawing device, and it is necessary to determine the storage place by the degree of freedom of the graphic pattern definition length and the tradeoff of the drawing speed of the graphics. However, in the pixel cache of the present invention, the graphic pattern data replaced on the memory and the mapping of the graphic patterns to the drawing can be performed at a similar speed to the conventional three methods or at a speed more than the same.

Further, according to the present invention, since the storage place of the graphic patterns is fixed to one place of 'on the memory', there is no need to separate the situation as in the convention manner, that is, "in case of the long graphic pattern, it is placed on the memory and in case of the short graphic pattern, it is placed on the working memory or the pattern register", and thus by using one drawing control routine, all graphic patterns can be dealt with.

While the present invention has been described with reference to the particular illustrative embodiment, it is not to be restricted by that embodiment but only by the appended claims. It is to be appreciated that those skilled in the art can change or modify the embodiment without departing from the scope and spirit of the present invention.

What is claimed is:

1. A graphic pattern storage device, comprising:

a plurality of stages connected in series including an uppermost stage and a lowermost stage for storing graphic pattern data;

shift means connected between said plurality of stages for transferring the pattern data from the uppermost stage to the lowermost stage;

write means including an external input bus for writing the graphic pattern data into any of said plurality of stages;

feedback means including a feedback bus for transferring the graphic pattern data stored in the lowermost stage to any of said plurality of stages except the lowermost stage; and selecting means for selecting one of the write means and the feedback means for use with respect to the uppermost stage and one of the shift means, the write means and the feedback means for use with respect to each of said plurality of stages, except the uppermost stage, wherein the selecting means includes:
- a write pointer for indicating one of said plurality of stages to control the write means for writing the graphic pattern data to the indicated write pointer stage; and
- a feedback pointer for indicating one of said plurality of stages to control the feedback means for feeding back the graphic pattern data to the indicated feedback pointer stage.

2. A graphic pattern storage device, comprising:

a plurality of stages connected in series including an uppermost stage and a lowermost stage for storing graphic pattern data;

shift means connected between said plurality of stages for transferring the pattern data from the uppermost stage to the lowermost stage;

write means including an external input bus for writing the graphic pattern data into any of said plurality of stages;

feedback means including a feedback bus for transferring the graphic pattern data stored in the lowermost stage to any of said plurality of stages except the lowermost stage; and selecting means for selecting one of the write means and the feedback means for use with respect to the uppermost stage and one of the shift means, the write means and the feedback means for use with respect to each of said plurality of stages, except the uppermost stage, wherein each of said plurality of stages includes:
- a register for storing the graphic pattern data; and
- a valid bit flag for indicating whether or not a value stored in the register is valid,
- and said selecting means being operative in response to said valid bit flag.

* * * * *